United States Patent
Zeller et al.

(10) Patent No.: US 9,996,223 B2
(45) Date of Patent: *Jun. 12, 2018

(54) DISPLAYING A CONTEXTUAL ORGANIZATION CHART WITH AWARENESS

(71) Applicant: International Business Machines Corporation, Armonk, NY (US)

(72) Inventors: Marijane M. Zeller, Medford, MA (US); Michael D. Elder, Durham, NC (US); Oliver Heinz, West Newton, MA (US); Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/947,890

(22) Filed: Nov. 20, 2015

(65) Prior Publication Data

US 2016/0077690 A1    Mar. 17, 2016

Related U.S. Application Data

(63) Continuation-in-part of application No. 10/315,264, filed on Dec. 9, 2002, now Pat. No. 9,230,042.

(51) Int. Cl.
*G06F 3/0482* (2013.01)
*G06F 3/0486* (2013.01)
(Continued)

(52) U.S. Cl.
CPC .......... *G06F 3/0482* (2013.01); *G06F 3/0486* (2013.01); *G06F 17/30994* (2013.01);
(Continued)

(58) Field of Classification Search
CPC .. G06F 17/30994; G06Q 10/10; G06T 11/206
See application file for complete search history.

(56) References Cited

U.S. PATENT DOCUMENTS

| 4,764,867 A | 8/1988 | Hess |
| 5,493,489 A | 2/1996 | Tamaki et al. |
| 5,621,201 A | 4/1997 | Langhans et al. |
| 5,829,003 A | 10/1998 | Okura |

(Continued)

FOREIGN PATENT DOCUMENTS

| JP | 08329156 A | 12/1996 |
| JP | 10105598 A | 4/1998 |
| JP | 2001350883 A | 12/2001 |

OTHER PUBLICATIONS

Cherry, "IM Means Business," Nov. 2002, pp. 28-32, IEEE Spectrum.

(Continued)

*Primary Examiner* — Jorge A Casanova
(74) *Attorney, Agent, or Firm* — Ryan Lewis; Hoffman Warnick LLC

(57) ABSTRACT

A contextual organization chart based on two selected individuals is constructed from a database of individual names, manager names, and profiles. Awareness data is provided for people in the organization, a people awareness indicator and a nesting control indicator are appended to names in the constructed view. A user may access profile data by selecting a name in the view, expand the view to show additional individuals by selecting a nesting control indicator, or initiate a communication with an individual by selecting an awareness indicator.

20 Claims, 6 Drawing Sheets

(51) Int. Cl.
*G06F 17/30* (2006.01)
*G06Q 10/10* (2012.01)
*G06T 11/20* (2006.01)

(52) U.S. Cl.
CPC ......... *G06Q 10/103* (2013.01); *G06Q 10/107* (2013.01); *G06T 11/206* (2013.01)

(56) References Cited

U.S. PATENT DOCUMENTS

| | | | |
|---|---|---|---|
| 5,953,724 | A | 9/1999 | Lowry |
| 6,018,342 | A * | 1/2000 | Bristor ................. G06F 9/4443 707/999.003 |
| 6,067,548 | A | 5/2000 | Cheng |
| 6,072,493 | A | 6/2000 | Driskell et al. |
| 6,128,617 | A | 10/2000 | Lowry |
| 6,148,328 | A | 11/2000 | Cuomo et al. |
| 6,191,786 | B1 | 2/2001 | Eyzaguirre et al. |
| 6,324,541 | B1 | 11/2001 | de l'Etraz et al. |
| 6,377,287 | B1 | 4/2002 | Hao et al. |
| 6,442,557 | B1 | 8/2002 | Buteau et al. |
| 6,677,968 | B1 | 1/2004 | Appelman |
| 6,990,495 | B1 | 1/2006 | Grason et al. |
| 2002/0021307 | A1 | 2/2002 | Glenn et al. |
| 2002/0030703 | A1 | 3/2002 | Robertson et al. |
| 2002/0111887 | A1 | 8/2002 | McFarlane et al. |
| 2002/0118214 | A1 | 8/2002 | Card et al. |
| 2002/0143949 | A1 * | 10/2002 | Rajarajan ............. G06F 9/4443 709/226 |
| 2003/0208543 | A1 | 11/2003 | Enete et al. |
| 2004/0024629 | A1 | 2/2004 | Kirby, Jr. et al. |
| 2004/0064568 | A1 | 4/2004 | Arora et al. |

OTHER PUBLICATIONS

Guernsey, "You Can Surf, but You Can't Hide," Feb. 2002, 4 pages, Technology the New York Times.
Advanced Personnel Systems, "Organization Charting Software," 2002, 3 pages.
Awarenex, "Staying in Touch—Awareness for Remote Workers," retrieved from: http://research.sun.com/features/awarenex, Sep. 2002, 6 pages.
Moore, "Lotus Readies Collaboration Upgrades," Sep. 2002, 4 pages, ComputerWorld.
Pogue, "Mac OS X: The Missing Manual, 2nd Edition," Oct. 2002, 15 pages, O'Reilly, Chapter 20.2.
Visimation, Inc., "Using the Visio 2002 Organization Chart Solution," Oct. 2001, pp. 1-8, Microsoft TechNet.
Stace, Office Action Communication for U.S. Appl. No. 10/315,264 dated Nov. 22, 2005, 12 pages.
Stace, Office Action Communication for U.S. Appl. No. 10/315,264 dated Oct. 22, 2008, 15 pages.
Stace, Office Action Communication for U.S. Appl. No. 10/315,264 dated Oct. 23, 2009, 13 pages.
Stace, Office Action Communication for U.S. Appl. No. 10/315,264 dated May 23, 2011, 23 pages.
Stace, Office Action Communication for U.S. Appl. No. 10/315,264 dated Jul. 19, 2010, 19 pages.
Casanova, Notice of Allowance and Fee(s) Due for U.S. Appl. No. 10/315,264 dated Aug. 21, 2015, 12 pages.
Stace, Office Action Communication for U.S. Appl. No. 10/315,264 dated May 13, 2005, 18 pages.
Stace, Office Action Communication for U.S. Appl. No. 10/315,264 dated May 12, 2008, 12 pages.
Stace, Office Action Communication for U.S. Appl. No. 10/315,264 dated Mar. 25, 2009, 15 pages.
Stace, Office Action Communication for U.S. Appl. No. 10/315,264 dated Feb. 2, 2010, 13 pages.
Stace, Office Action Communication for U.S. Appl. No. 10/315,264 dated Dec. 20, 2010, 23 pages.
Casanova, Office Action Communication for U.S. Appl. No. 10/315,264 dated Mar. 20, 2015, 17 pages.

* cited by examiner

FIG. 4

DISPLAYING A CONTEXTUAL ORGANIZATION CHART WITH AWARENESS

TECHNICAL FIELD

The present invention relates generally to presenting organizational structure information to a computer user. In particular the invention relates to a method and system for graphically displaying an organization chart including two individuals and their relative relationship within an organization along with profile, awareness, communication and nesting indicators for individuals on the chart.

BACKGROUND OF THE INVENTION

Various application programs provide a computer user information about the reporting structure of an organization in a graphical or organization chart format. For example, Robertson et al. in U.S. Patent Publication 2002/0030703 A1 describe creating and displaying a visual hierarchy of data objects. The objects may be individuals in an organization. The display of an object or person within a first hierarchy can be gradually transformed or morphed into the display of the same object or person within a second hierarchy. Techniques are described to morph between first and second hierarchies.

Lowry, in U.S. Pat. No. 6,128,617 describes rendering a hierarchical graphical listing or chart on a display. Further information may be retrieved from a database record leaving plural fields by selecting a node on the chart.

McFarlane et al., in U.S. Patent Publication 2002/0111887 A1 describe using an organization chart to provide summary reports of employee online activity. The summary reports include information on the employee as well as all other employees under the employee in the company organizational structure.

Other programs are available for drawing an organization chart using 'drag and drop' techniques or to create charts based on target individuals. The publication "Organization Charting Software" by Advanced Personnel Systems, P.O. Box 1438, Roseville, Calif. 95648 dated 2002 describes such programs.

Yasutaka also describes in Japanese patent abstract 08329156A, a device for preparing an organization chart by decoding hierarchical parameters in an organization plan data base.

Hess, in U.S. Pat. No. 4,764,867 describes an interactive computer display system for manipulating a hierarchy of information. A hierarchical arrangement of information is constructed with a minimum of steps and errors.

The abstract of Japanese patent 2001350883A to Okura Osamu describes an organization chart processor for displaying an organization chart on the screen of a display device. A user may input a 'movement' causing the processor to update the contents of a personnel database. Also an official announcement of the change is prepared, printed, and stored in a history file.

Masahiro describes in Japanese patent abstract 08329156A, an organization chart processor that prepares an organization chart in a tree structure from data in an employee master file. The processor also reads out an employee's face photograph from a face photograph file or other personal information from the employee master file and displays these on the organization chart.

Computer users in hierarchical organizations such as industrial companies, service organizations, educational organizations, non-profit companies, and the like frequently want to understand how a particular individual in their organization relates to themselves on the organization chart. Answering this question is a difficult process with all of the above described systems and methods, requiring multiple searches or scrolling up and down management chains. The larger the organization, the more difficult the task becomes because only a small part of the overall organization chart may be viewed on a computer screen at any given time. A system which rapidly and easily shows the relationship between only two individuals in an organization would therefore constitute a significant advancement in the art.

In addition to showing the relationship between two individuals, a user typically wishes to learn more about the second individual as well as those in their respective and common manager chains. It is therefore a desirable feature to have the ability to easily request individual profile data or graphics, photograph, or the like for any such individual by merely clicking on an individual name, or an icon, or selection button associated with an individual name. For example, in the Lowry patent listed above one may request additional information by selecting a node on a hierarchical chart.

Recently presence technology systems and methods have been developed. For example, Cuomo et al. in U.S. Pat. No. 6,148,328, describe providing information to a target user about other users in an online environment. The target user is informed as other users enter or leave the networked environment. The target user may be notified through use of a list where other users' names appear or change color as they log onto or off of the network. An audio signal may also be used to alert the target user to another user's change in status. U.S. Pat. No. 6,148,328 is incorporated herein by reference in its entirety.

Instant messaging systems such as SAMETIME® product (SAMETIME is a trademark of IBM Corporation) provided by IBM Corporation of Armonk, N.Y. include such a presence information display in a window on a user's computer screen.

In addition to a person's on-line status, presence technology as described by Lisa Guernsey in the New York Times article "You Can Surf, but You Can't Hide" dated Feb. 7, 2002, may also show whether another person's phone is in use, or for a cellular telephone, whether it is even turned on. According to Guernsey, presence technology is also being considered for hand-held computers, wireless Web pads, communication systems in cars, or nearly any wired or wireless device of the future including household appliances or exercise machines at the gym. Some planned systems will use tracking systems like the Global Positioning System (GPS) to detect the location of a person who is logged on.

Glenn et al. describe, in U.S. Patent Publication 2002/0021307 A1, a method of displaying a presence indicator if a user is connected to an interconnection fabric. The method also provides for initiating an instantaneous communication interface to an initiating user when the presence indicator is selected and the receiving user is connected to the interconnection fabric.

It would therefore be a highly desirable and inventive feature if the desired relationship chart above could include presence information about the second individual and those in their respective and common manager chains. Furthermore it would be highly desirable if the first individual could establish communication with any of those persons on the relationship chart by selecting a presence indicator associated with that individual.

OBJECTS AND SUMMARY OF THE INVENTION

It is therefore a principal object of the present invention to enhance the art of displaying hierarchical organizational structure by providing a method with enhanced capability.

It is another object to provide such a method wherein enhanced and simplified operational capabilities are possible.

It is a further object to provide such a method which can be inexpensively distributed and easily operated by a wide variety of computer users.

It is yet another object to provide a system for implementing such a capability in a *facile* manner.

These and other objects are attained in accordance with one embodiment of the invention wherein there is provided a method of presenting an organization structure, comprising the steps of providing a database of names of individuals in an organization, each of the individual names having an associated manager name and a profile, providing people awareness data for each of the individuals in the organization, selecting a first and a second individual from the organization without requiring multiple searches, constructing a view showing the manager chain of the first and second individuals up to the point where there is a common manager and then a single manager chain to a higher level manager in the organization, appending an indicator of the people awareness data and a nesting control indicator to names in the view, and displaying the view on a computer screen wherein a user may access the profile by selecting a name in the view, initiate a communication with an individual by selecting the people awareness indicator, or expand he view by selecting said nesting control indicator.

In accordance with another embodiment of the invention there is provided a system for presenting an organization structure, comprising a database of names of individuals in an organization, each of said individual names having an associated manager name and a profile, people awareness data in the database for each of the individuals in the organization, means for constructing a view showing the manager chain of a first and a second individual up to the point where there is a common manager and then a single manager chain to a higher level manager in the organization without requiring multiple searches, means for appending an indicator of the people awareness data and a nesting control indicator to names in the view, a computer screen for displaying said view, and means for allowing a user to access the profile by selecting a name in the view, initiate a communication with an individual by selecting the people awareness indicator, or expand said view by selecting the nesting control indicator.

In accordance with yet another embodiment of the invention there is provided a computer program product for instructing a processor to present an organization structure, comprising a computer readable medium, first program instruction means for providing a database of names of individuals in an organization, each of the individual names having an associated manager name and a profile, second program instruction means for providing people awareness data for each of the individuals in said organization, third program instruction means for selecting a first and a second individual from the organization without requiring multiple searches, fourth program instruction means for constructing a view showing the manager chain of the first and second individuals up to the point where there is a common manager and then a single manager chain to a higher level manager in the organization, fifth program instruction means for appending an indicator of the people awareness data to a nesting control indicator to names in the view, and sixth program instruction means for displaying the view on a computer screen wherein a user may access the profile by selecting a name in the view, initiate a communication with an individual by selecting the people awareness indicator, or expand said view by selecting said nesting control indicator, and wherein all of the program instruction means are recorded on the medium.

BRIEF DESCRIPTION OF THE DRAWINGS

FIG. 4 is an organization chart in which the two individuals reside within a single manager chain;

BEST MODE FOR CARRYING OUT THE INVENTION

For a better understanding of the present invention, together with other and further objects, advantages and capabilities thereof, reference is made to the following disclosure and the appended claims in connection with the above-described drawings. In the following description, numerous specific details are given to provide a better description of the present invention. However, it will be apparent to one skilled in the art that the present invention may be practical without all of the specific details. In other instances, well known details have not been described in detail so as not to obscure the facts of the present invention. Where an item appears in more than one drawing, that item has the same number label in all drawings in which it appears as is customary.

Figure 1:
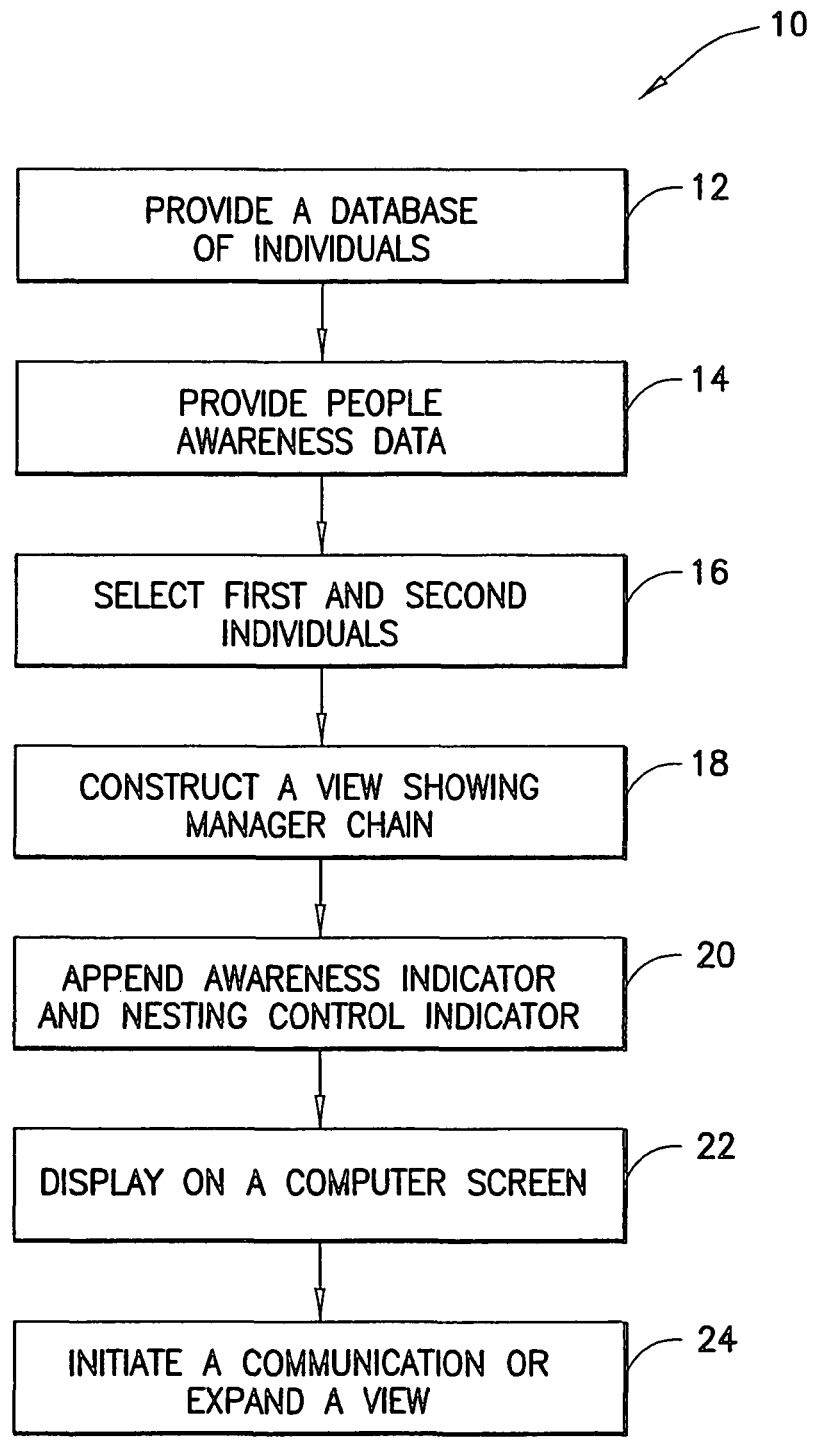
FIG. 1 is a flowchart of steps comprising a method of presenting an organization structure in accordance with the present invention.

In FIG. 1 there is shown flowchart 10 depicting one method of presenting an organization structure in accordance with the present invention. Step 12 provides a database of names of individuals in an organization. The database may be any type of database such as a hierarchical database, a relational database, a spreadsheet database or any other type of database. The database may be stored on any type of media known for storing data such as hard drive, floppy diskette, zip diskette, magnetic tape, CD or DVD ROM, or the like. It may also be stored in an electronic memory device such as a static or dynamic RAM, a flash memory, a PROM, ROM, EPROM or EEPROM or any type of memory device.

The specific organization of names of individuals within the database is of no consequence to the present invention provided that each individual name has an associated manager name and a profile. Neither the associated manager name, nor the profile needs to be stored in the same database as the individual name, provided that each can be retrieved from wherever stored and associated with the respective individual name. Those of ordinary skill in the art will recognize that such an association can be made regardless of where the individual name, manager name, and profile are stored, even if stored at a remote location.

The profile may include various data pertaining to the individual including, work location, job title, a photograph, or any other data related to the individual. The profile may also be partially or completely blank if no such data is available, or if for some reason such as privacy or security, such data is not available for that particular individual.

In step 14 people awareness data is provided for the individuals whose names are in the database of step 12. This data may include whether an individual is logged on to a network, whether the individual is available to receive an instant message, whether the individual's cell phone is turned on, whether the cell phone, office phone, home phone, or any other phone is in use and the number the phone is connected to, the registered owner of that number, whether the individual has a geographical position device such as a GPS (global positioning system) device and the location of that device, whether the individual has a web page displayed on a computer screen and an identification of that page, and whether the individual has a video or digital camera active, and the current video stream or image being captured by the camera. Because of privacy concerns, the individual may choose whether to allow such data to be provided or not and data indicating such choices may also be provided or not.

Awareness data may be provided, for example, by running an instant application or any other application or combination of applications having awareness capability. Data for particular individuals in the view described below is extracted from the applications and provided for use in step 20 below. An application may, for example, track an individual's online status and provide updated awareness data as the status changes.

Awareness data may be stored in the same database as the profile data. However, awareness data may also be stored in a different database, or at a different location including remote locations.

In step 16 a user selects first and second individuals from an organization. In one embodiment, one of these individuals is the user himself and the other individual is the person to whom the user wishes to understand his organizational relationship and to learn more about. The selecting of a first and second individual can be done without requiring multiple searches, and in some embodiments, requiring no search at all. For instance, previous searches, or individuals previously viewed may be stored in, e.g., a cache. In embodiments, the cached names can appear without the use of a search, or with only a single search, allowing the user to select names without searching for the desired individuals.

In step 18 a view is constructed showing the manager chain of the first and second chosen individuals proceeding upward in the organization until a common manager is reached, and thereafter a single manager chain up to a higher or highest level manager in the organization. Such a focused view of an organization chart shows only the connected pieces of the hierarchy that are specifically of interest. This compact display of the manager chains for two individuals and the point they intersect can fit easily on a computer or PDA (personal digital assistant} screen, regardless of the size of the organization.

Figure 2:
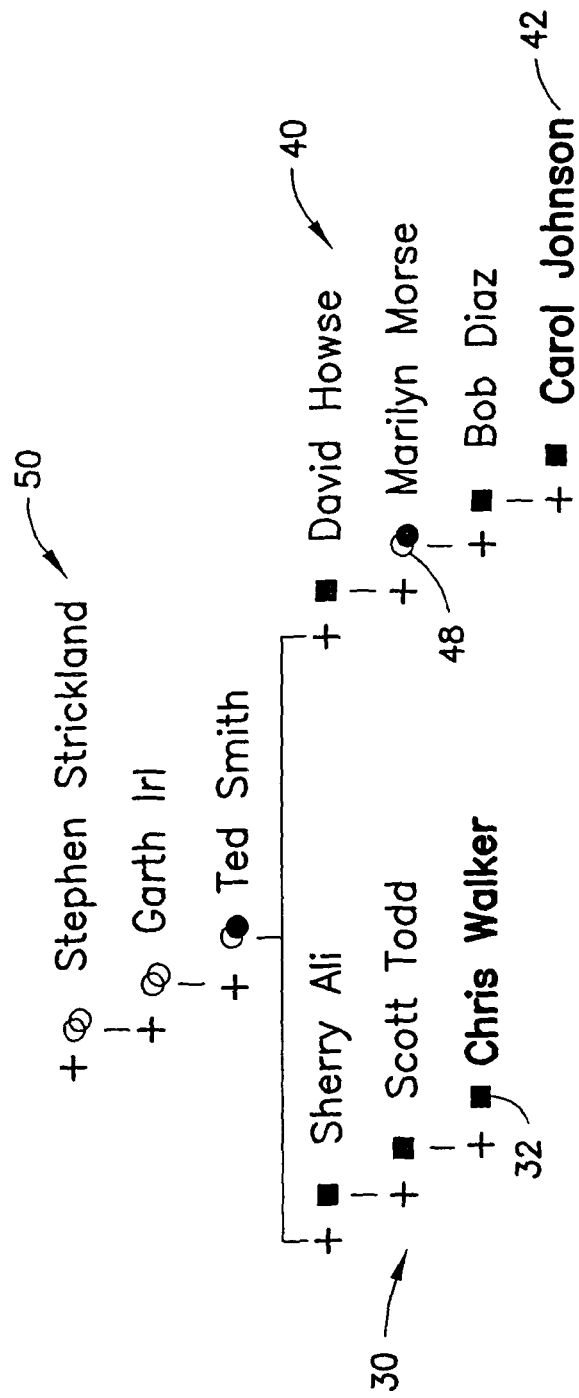
FIG. 2 is an organization chart showing relationship between two individuals.

FIG. 2 shows an example 50 of such a view. Chris Walker and Carol Johnson 42 are the two individuals selected in steps 16. Manager chains 30 and 40 respectively intersect with common manager Ted Smith. From these a single manager chain is shown.

In step 20 an awareness indicator and nesting control indicator is appended to each name in the view. The awareness indicator shows some or all of the people awareness data provided in step 14. For example, the square box 32 in FIG. 2 appended to Chris Walker indicates that Chris is currently on line and available to receive an instant message. Round dot 48 appended to Marilyn Morse by contrast indicates that Marilyn is logged on but away from her workstation and therefore not available to receive an instant message. Any type of indicator shape, color, size, or a plurality of indicators may be used depending on the presence data available for the particular individual, including no indicator if no date is available. The indicator may be appended before or after the individual's name and may be displayed in the view in any proximity to the name provided it is clear and unambiguous which indicator is associated with which individual name.

Figure 3:
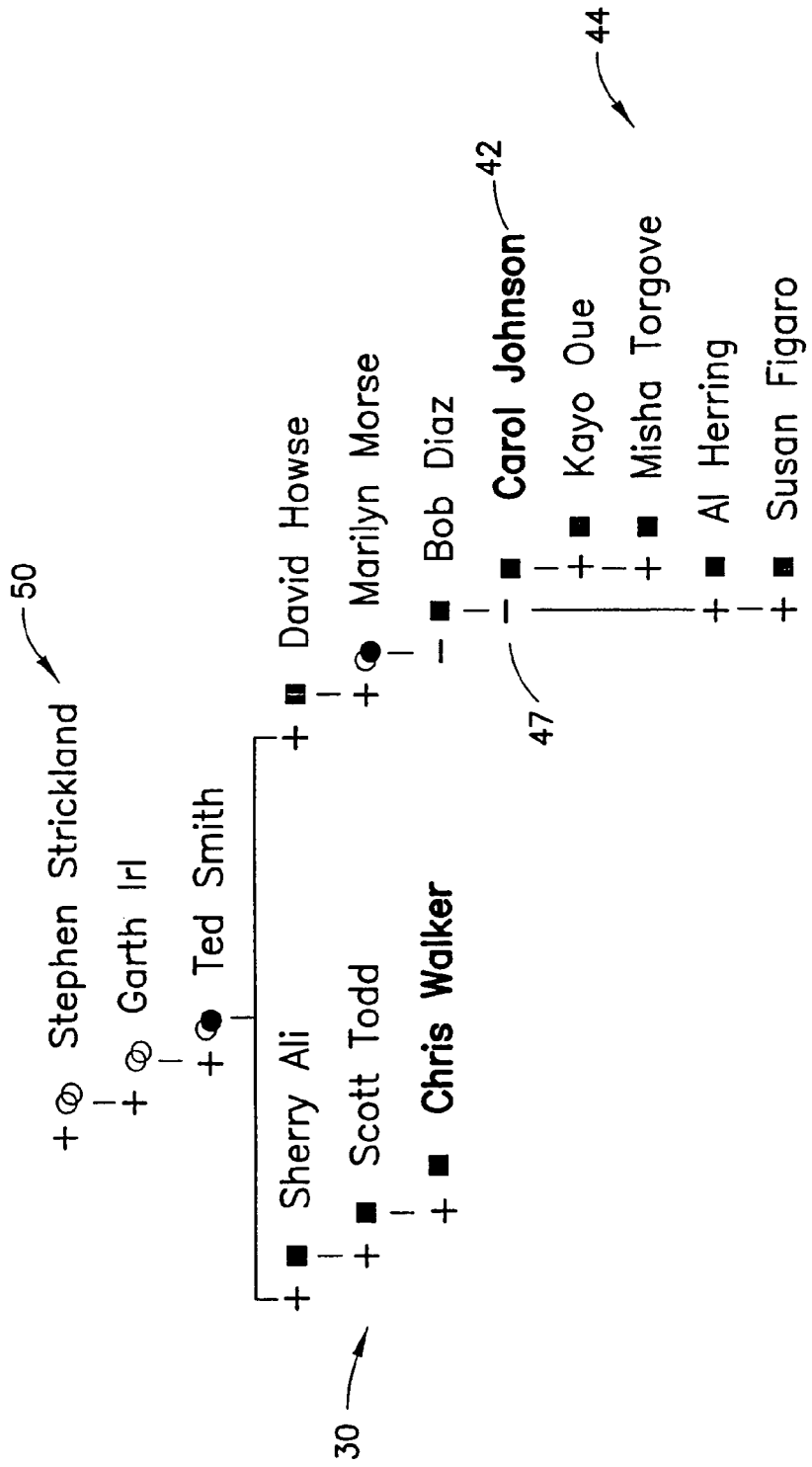
FIG. 3 is the organization chart of FIG. 2 with an expanded view.
Figure 5:
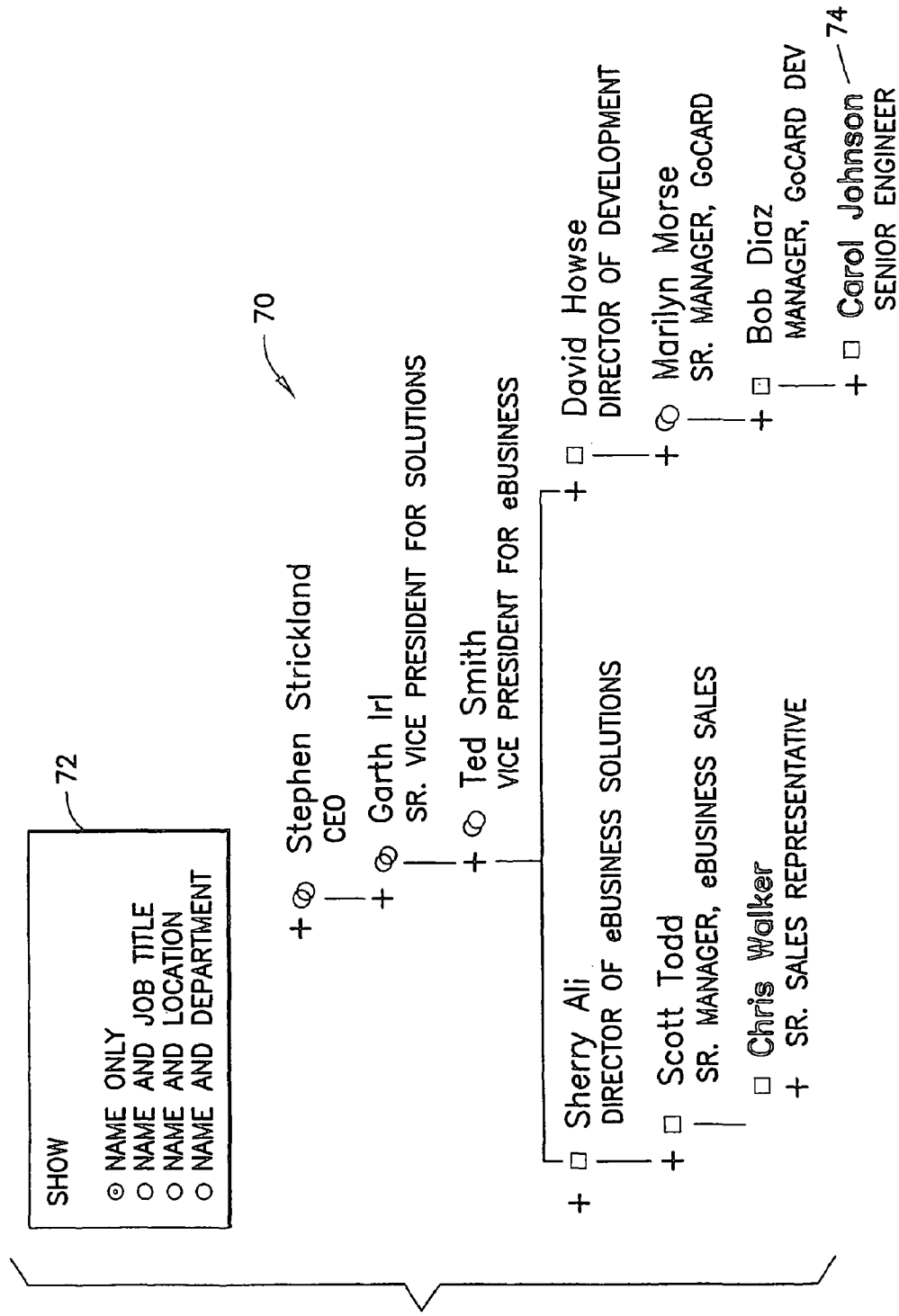
FIG. 5 shows an organization chart where additional information has been requested.

A nesting control indicator such as indicator 47 of FIG. 3 is also appended to Carol Johnson 42. The user can expand the view if he wishes to see more of the hierarchy. Any type of indicator may be used including the commonly used plus and minus signs as depicted in FIG. 3.

Figure 4:
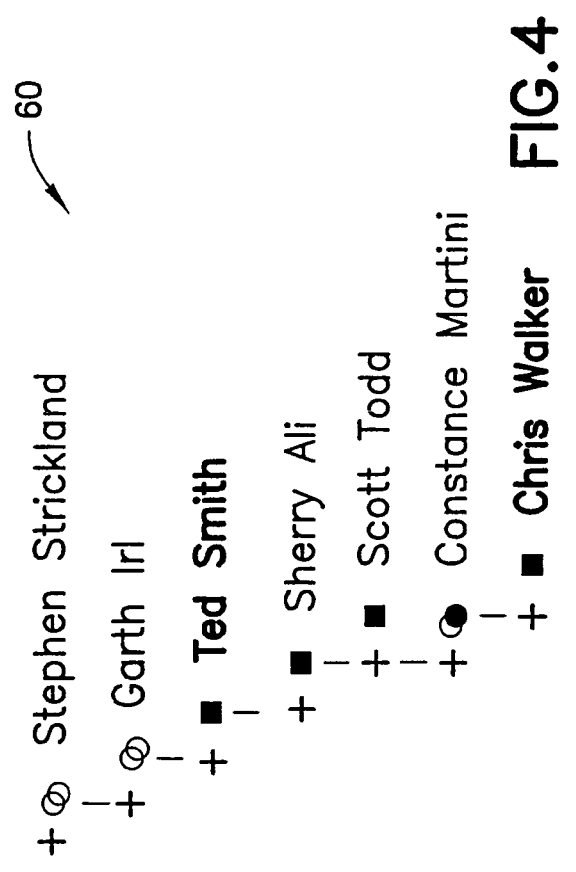

FIG. 4 shows the view 60 for a case where both individuals reside in a single manager chain.

In step 22, the view constructed in steps 18 and 20 is displayed on a computer or PDA screen. Any type of display device may be used. Examples include CRT (cathode ray tube}, LCD (liquid crystal display), plasma display, projection display, and the like. In addition to FIGS. 2-4, FIG. 5 also shows an example of such a view 70. A profile 72 may be selected for any or all individuals in the view.

The user may initiate a communication with an individual in the view by selecting the awareness indicator associated with that person 32. The communication may comprise an instant message, an e-mail, a telephone call, a video session, still picture communication, or screen session. A screen session allows the individual associated with the selected awareness indicator to see on his display screen whatever the user has displayed on the user's screen.

For example, selecting awareness indicator 32 may provide the associated individual's name e.g. Chris Walker in FIG. 2, to an instant messaging application which provided awareness in step 14. Selecting awareness indicator 32 may also drive that application to open a chat session with Chris Walker. Other awareness applications providing data in step 14 may be driven by selecting awareness indicator 32 to initiate the other types of communication listed above, depending on the particular characteristics of the awareness application.

In step 24 of FIG. 1 such a communication is initiated by the user by selecting an awareness indicator in the view.

Figure 6:
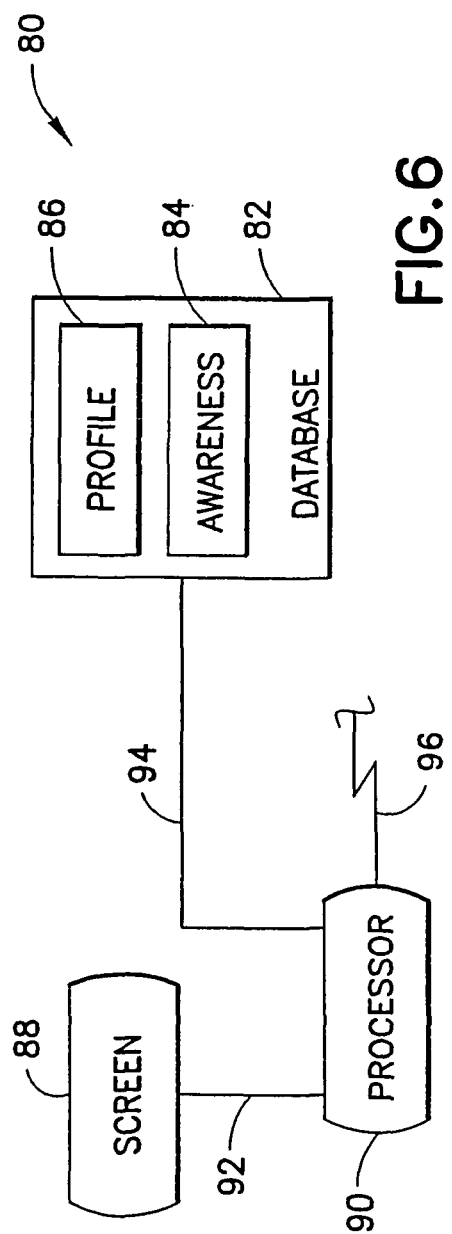
FIG. 6 is a system in accordance with the present invention.

In FIG. 6 there is shown a system 80 for presenting an organization structure in accordance with the present invention. Database 82 has therein names of individuals in an organization. Each of the individual names has an associated manager name to which that individual reports, and a profile 86 as described above.

People awareness data 84 is also included in database 82. In other embodiments, awareness data 84 may be located in a different database as noted above.

Processor 90 has access to database 82 via path 94 which may be a network connection of any type including LAN (local area 25 network), WAN (wide area network), dial up I modem connection, fiber optic link, wireless, infrared connection, or the like. Database 82 may also be completely stored within processor 90 such as on a hard drive, floppy drive, diskette, zip drive, CD (compact disk), or DVD (digital video disk). In this case connection 94 may be a databus within processor 90.

Display screen 88 is attached to processor 90 through connection 92 which is any type of connection known for such use.

Processor 90 includes means for constructing the manager chain view described above. For example, processor 90 may have a computer program or set of instructions stored in a memory device and an electronic device for processing the instructions to construct the view.

Processor 90 has similar means for appending an indicator of respective awareness data 84 to individuals in the view. Processor 90 also has means for appending a nesting control indicator to the individual names. The constructed view may be sent to screen 88 to be displayed.

Processor 90 also has means for allowing a user to access profiles 86 by selecting a name in the view, for example, by using a selecting device such as a mouse, trackball, keyboard, or other selection device.

Processor 90 has means for a user to initiate a communication with an individual by selecting a people awareness indicator in the view. The communication may operate by sending data, voice, or video, whether in digital, analog, or mixed form over a communication path 96 which may be any type of interconnection between communicating devices, including those listed above for connection 94.

Processor 90 also includes means for a user to expand the view by selecting a nesting control indicator. An expanded view, for example as shown in FIG. 3, may involve showing additional individuals in the organization. Processor 90 obtains data for such an expanded view by accessing database 82 over path 94.

While there have been shown and described what are at present considered the professed embodiments of the invention, it will be obvious to those skilled in the art that various changes and modifications may be made therein without departing from the scope of the invention as defined by the appended claims.

What is claimed is:

1. A method of presenting an organization structure, comprising the steps of:
    providing a database of names of individuals in an organization, each of said individual names having an associated manager name and a profile;
    providing people awareness data for each of said individuals in said organization;
    selecting a first and a second individual from said organization without requiring a search, said selecting including:
        displaying a list of names, said list of names including only names having been previously viewed by a user during a previous search or a distinct user during a previous search,
        automatically selecting the user as the first individual, and
        selecting at least one of said names from said list of names as the second individual;
    constructing a view showing names of those in a manager chain of said first and second individuals, every name in the manager chain being a name of at least one of the first individual, the second individual or a manager of either of the first or second individual up to the point where there is a common manager, and then a single manager chain to at least one manager at a higher level than the common manager in said organization, wherein the single manager chain showing only manager names above the common manager, wherein the constructing is configured to construct the view from any first and second individual in said organization regardless of whether the first and second individual share a common immediate manager;
    appending an indicator of said people awareness data and a nesting control indicator to names in said view; and
    displaying said view on a computer screen wherein the user may access said profile by selecting a name in said view, initiate a communication with an individual by selecting said people awareness indicator, or expand said view by selecting said nesting control indicator, wherein the profile is displayed in proximity to the respective name in the view, and wherein the profile includes at least: a job title and a work location.

2. The method of claim 1, wherein said profile includes contact information, or skills, or background information for said individual.

3. The method of claim 1, wherein said people awareness data includes whether said individual has a workstation logged on, or whether said individual is active at said logged on workstation.

4. The method of claim 1, wherein said manager chain of said first individual is shown beside said manager chain of said second individual in a wishbone pattern.

5. The method of claim 1, wherein said single manager chain is extended upward to the highest level manager in said organization.

6. The method of claim 1, wherein said nesting control indicator is a common plus or minus nesting control indicator.

7. The method of claim 1, wherein said communication is an instant message, or an on-line chat, or an e-mail.

8. The method of claim 1, further comprising the step of expanding said view by selecting said nesting control indicator to show additional individuals reporting to the individual name selected.

9. The method of claim 1, further comprising the step of scrolling said expanded view to view said additional individuals.

10. The method of claim 1, wherein the list of names previously viewed by the user is stored in a cache, and the list of names stored in the cache is provided without a current search.

11. A system for presenting an organization structure, comprising:
    a database of names of individuals in an organization, each of said individual names having an associated manager name and a profile;
    people awareness data in said database for each of said individuals in said organization;
    means for displaying a list of names without requiring a search, said list of names including only names having been previously viewed by a user during a previous search or a distinct user during a previous search, the user being automatically selected as a first individual, and
    means for allowing the user to select at least one of said names from said list of names as a second individual;
    means for constructing a view showing names of those in a manager chain of the first and second individuals, every name in the manager chain being a name of at least one of the first individual, the second individual or a manager of either of the first or second individual up to the point where there is a common manager, and then a single manager chain to at least one manager at a higher level than the common manager in said organization, wherein the single manager chain showing only manager names above the common manager, wherein the constructing is configured to construct the view from any first and second individual in said organization regardless of whether the first and second individual share a common immediate manager;

a computer screen for displaying said view; and means for allowing the user to access said profile by selecting a name in said view, initiate a communication with an individual by selecting said people awareness indicator, or expand said view by selecting said nesting control indicator, wherein the profile is displayed in proximity to the respective name in the view, and wherein the profile includes at least: a job title and a work location.

12. The system of claim 11, wherein said profile includes contact information, or skills, or background information for said individual.

13. The system of claim 11, wherein said people awareness data includes whether said individual has a workstation logged on, or whether said individual is active at said logged on workstation.

14. The system of claim 11, wherein said single manager chain is extended upward to the highest level manager in said organization.

15. The system of claim 11, wherein said manager chain of said first individual is shown beside said manger chain of said second individual in a wishbone pattern.

16. The system of claim 11, wherein said nesting control indicator is a common plus or minus nesting control indicator.

17. The system of claim 11, wherein said communication is an instant message, or an on-line chat, or an e-mail.

18. The system of claim 11, wherein said view is expanded to show additional individuals reporting to the individual name selected.

19. The system of claim 11, further comprising means for scrolling said expanded view to view said additional individuals.

20. A non-transitory computer readable medium wherein program instruction means are recorded on the medium for instructing a processor to present an organization structure, comprising:

first program instruction means for providing a database of names of individuals in an organization, each of said individual names having an associated manager name and a profile;

second program instruction means for providing people awareness data for each of said individuals in said organization;

third program instruction means for selecting a first and a second individual from said organization without requiring a search, said selecting including:
displaying a list of names, said list of names including only names having been previously viewed by a user during a previous search or a distinct user during a previous search,
automatically selecting the user as the first individual, and
selecting at least one of said names from said list of names as the second individual;

fourth program instruction means for constructing a view showing names of those in a manager chain of said first and second individuals, every name in the manager chain being a name of at least one of the first individual, the second individual or a manager of either of the first or second individual up to the point where there is a common manager, and then a single manager chain to at least one manager at a higher level than the common manager in said organization, wherein the single manager chain showing only manager names above the common manager, wherein the constructing is configured to construct the view from any first and second individual in said organization regardless of whether the first and second individual share a common immediate manager;

fifth program instruction means for appending an indicator of said people awareness data and a nesting control indicator to names in said view; and sixth program instruction means for displaying said view on a computer screen wherein a user may access said profile by selecting a name in said view, initiate a communication with an individual by selecting said people awareness indicator, or expand said view by selecting said nesting control indicator, wherein the profile is displayed in proximity to the respective name in the view, and wherein the profile includes at least: a job title and a work location; and wherein all of said program instruction means are recorded on said medium.

* * * * *